United States Patent [19]

Ikuta

[11] Patent Number: 5,127,600
[45] Date of Patent: Jul. 7, 1992

[54] DOUBLE-BEARING FISHING REEL

[75] Inventor: Takeshi Ikuta, Sakai, Japan

[73] Assignee: Shimano Industrial Company, Limited, Osaka, Japan

[21] Appl. No.: 554,851

[22] Filed: Jul. 20, 1990

[51] Int. Cl.$^5$ ............................................. A01K 89/015
[52] U.S. Cl. .............................................. 242/280
[58] Field of Search ............... 242/158.3, 278, 279, 242/280, 149; 254/334, 335, 336

[56] References Cited

U.S. PATENT DOCUMENTS

| 1,468,128 | 9/1923 | Adams | 242/280 |
| 2,962,906 | 12/1990 | Cornish | 242/158.3 |
| 4,108,264 | 8/1978 | Tanaka | 254/334 X |
| 4,557,429 | 12/1985 | Atobe | 242/280 |
| 4,583,699 | 4/1986 | Karlsson | 242/280 |
| 4,666,101 | 5/1987 | Atobe | 242/280 |
| 4,799,628 | 1/1989 | Watanabe et al. | 242/280 X |

Primary Examiner—Katherine Matecki
Attorney, Agent, or Firm—Dickstein, Shapiro & Morin

[57] ABSTRACT

A double-bearing fishing reel, wherein a slider is rotatable with respect to a traverse shaft, a fishing line guide is formed of a pair of guide bodies so as to be movable with respect to the slider in the moving direction thereof, so that, when the guide bodies move close to each other, a fishing line to be wound onto a spool can be nipped by the guide bodies, a movement control mechanism for moving the guide bodies by rotation of the slider is provided, and a control member for rotatably operating the slider at an optional time is provided.

6 Claims, 2 Drawing Sheets

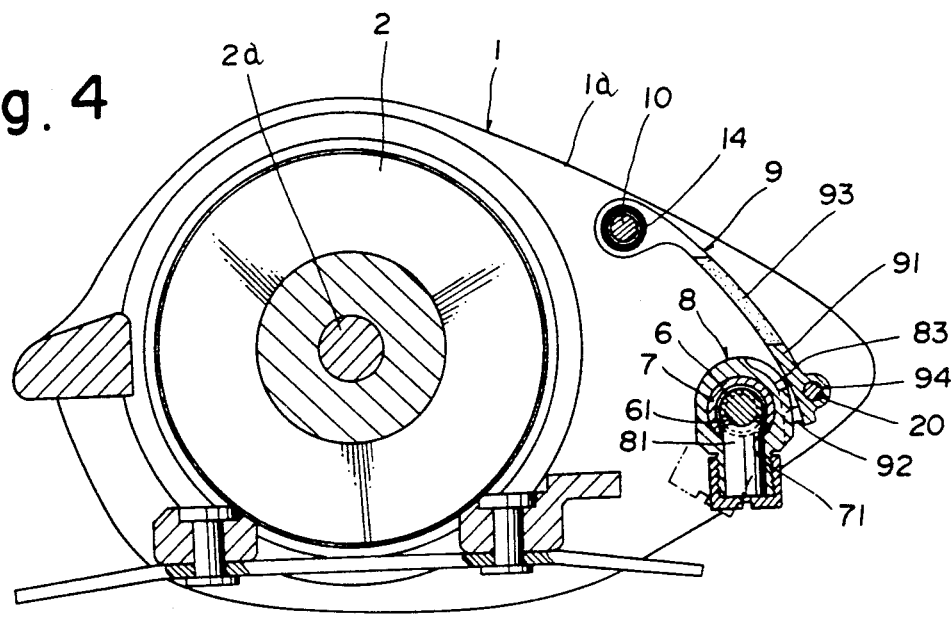
Fig. 4
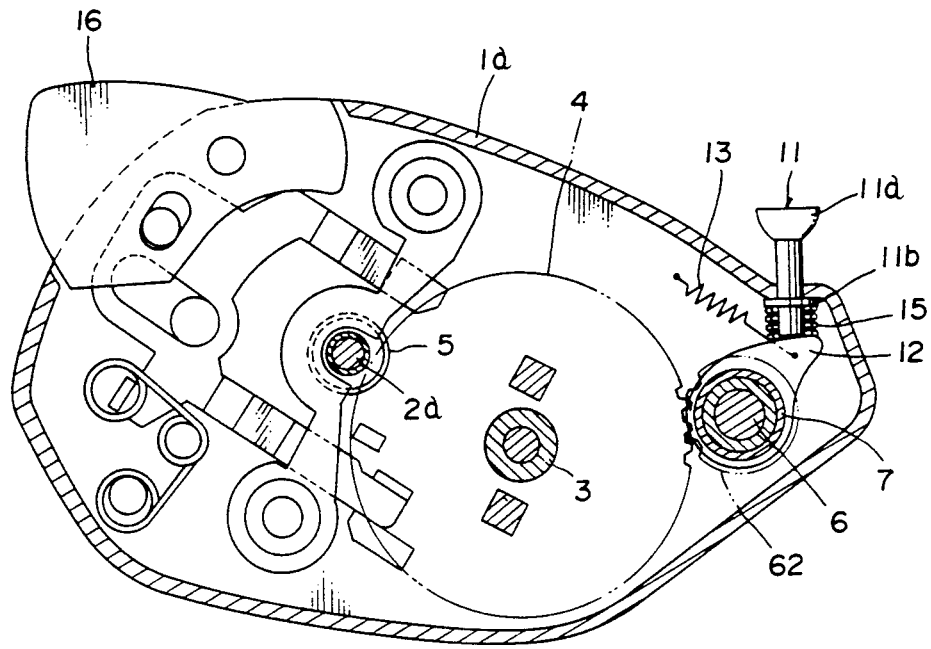
Fig. 5
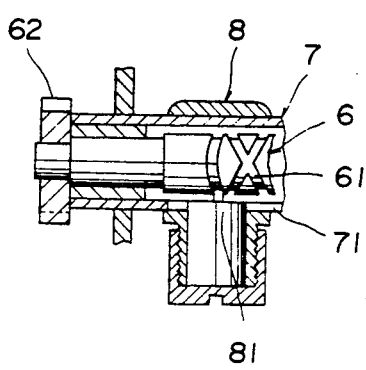
Fig. 6
Fig. 7

DOUBLE-BEARING FISHING REEL

FIELD OF THE INVENTION the present invention relates to a double-bearing fishing reel, and more particularly to a double-bearing fishing reel which rotatably supports a spool between a pair of side frames so that a fishing line is adapted to be guided by a fishing line guide and uniformly wound onto the spool.

BACKGROUND OF THE INVENTION

Generally, this kind of fishing reel, as disclosed in the Japanese Utility Model Application Sho 57-141768, is provided with a fishing line guide for guiding to the spool the fishing line to be wound thereon and clutch means, so that the clutch means is engaged to transmit rotation of a handle shaft to a spool shaft to thereby wind the fishing line onto the spool and kthe clutch means is disengaged to allow the spool shaft to be freely retatable so as to cast the line for fishing.

During the casting, the line drawn out from the spool is cast describing a parabola and becomes slack between a rig mounted to the terminal of line and the spool. The line wound onto the spool in slack condition causes a loose portion at the wound line. Hence, generally, until the slack line drawn out from the spool is stretched after the casting, the line is given a predeterined tension and wound onto the spool, thereby making the line tensile.

When the drawn-out line is intended to be given tension, usually, the line in front of the spool is brought into press-contact with the surface of a fishing rod by an angler's finger and, in this state, the spool is rotated to wind up the line in a predetermined length. In this case, however, the line is very thin, the surface of fishing rod is round, and the line moves axially of the spool following movement in reciprocation of fishing guide, thereby creating the problem in that it requires skill to give tension to the line and every one is not easy to operate.

Also, the line of synthetic fiber yarn, such as nylon, when repeatedly wound, gets wavy, thereby creating the problem in that jthe line is easy to get twisted.

SUMMARY OF THE INVENTION

An object of the invention is to provide a double-bearing fishing reel which can simply give tension to the line in order to eliminate a slack therefrom and also can simply eliminate waviness of the line.

The present invention is characterized in that a double-bearing fishing kreel is provided with a pair of side frames, a spool rotatably supported between the side frames, a traverse shaft rotatable in association with the rotation of spool and having traverse grooves, a slider having an engaging member engageable with the traverse grooves and movable in reciprocation axially of the traverse shaft, and a line guide supported to the slider and movable in reciprocation together therewith, wherein the slider is retatably supported with respect to the traverse shaft, the line guide comprises two guide bodies opposite to each other in the moving direction of the slider, at least one of the gu ide bodies is movably supported to the slider in the moving direction thereof, so that when the guide bodies move close to each other, the line is nipped between the opposite surfaces of guide bodies; and further the fishing reel is provided with a movement control mechanism provided between the movable guide body and the slider so as to move the movable guide body away from or toward the other guide body, and a control member for rotatably operating the slider.

In the double-bearing fishing reel of the invention constructed as the above-mentioned, the control member is operated to move the movable guide body toward the other guide body so that the line can be nipped between the opposite surfaces of both the guide bodies, thereby enabling the line to be given tension. Accordingly, even when the line drawn-out from the spool after casting is given tension, the control member is merely operated to reliably give tension to the line, thereby simply stretching the line after casting.

Moreover, the line is wound up onto the spool in the state where the line is nipped between the guide bodies, whereby the line can easily be out of curl. Also, when the movable guide body is moved away from the other guide body by operating the control member, an interval between the opposite surfces of guide bodies is enlarged, thereby enabling the line to be guided with less resistance.

Other objects and aspects of the invention will become more apparent from the following description of embodiments with reference to the accompanying drawings.

BRIEF DESCRIPTION OF THE DRAWINGS

FIG. 4 is a longitudinally sectional side view of the same, FIG. 5 is a sectional view of the same taken at one side frame, FIG. 6 is a sectional view of a slider only, and FIG. 7 is a view in part explanatory of the operating state of a control member.

DETAILED DESCRIPTION OF THE INVENTION

Figure 1:
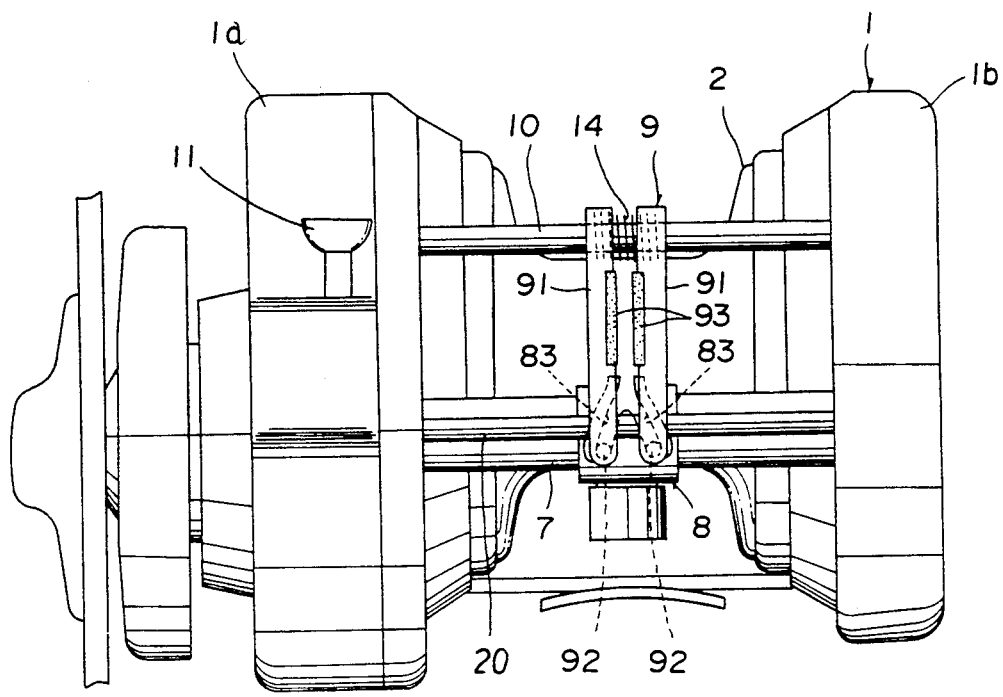
FIG. 1 is a partially omitted front view of an embodiment of a double-bearing fishing reel of the invention.

A double-bearing fishing reel shown in the drawing is so constructed that a spool 2 having a spool shaft 2a is rotatably supported between a pair of side frames 1a and 1b at a reel body 1 through a pair of bearings, at one side frame 1a is provided a driving mechanism comprising a handle shaft 3 rotatably supported to the side frame 1a, a master gear 4 supported to the handle shaft 3, a pinion 5 rotatably and axially movably supported to one axial end of spool shaft 2a and engageable with the master gear 4, and usual clutch means (not shown) provided between the pinion 5 and the spool shaft 2a, the handle shaft 3 being rotatably operated to rotate the spool 2, thereby winding up a fishing line thereon. In front of the spool 2 between the side frames 1a and 1b, a traverse shaft 6 having at the outer peripheral surface thereof traverse grooves 61 is supported rotatably and is parallel to the axis of the spool 2, the traverse shaft 6 is associated with rotation of the master gear 4 through an association gear 62 provided at the axial end of traverse shaft 6, a tubular shaft 7 having a window 71 extending axially of the tubular shaft 7 is sleeved onto the traverse shaft 6, a slider 8 having an engaging member 81 inserting into the tubular shaft 7 through the window 71 and engageable with the traverse grooves 61 is supported to the tubular shaft 7 in relation of being movable in reciprocation, and a fishing line guide 9 is provided at the slider 8. In addition, the slider 8 is tubular and has a fitting bote which is slidably fitted on the outer periphery of tubular shaft 7, and is provided at one lateral side with a holding bore for holding the engaging member 81. Between the side frames 1a and 1b are provided a pair of guide rods 10 and 20 extending in parallel to the trasverse shaft 6 and spaced at an interval, so that the line guide 9 is fitted at both lengthwise ends to the guide rods 10 and 20 respectively, whereby the line guide 9 is adapted to move along the traverse shaft 6.

In the embodiment shown in the drawing, the tubular shaft 7 is rotatably supported to the side frames 1a and 1b, and rotates to make the slider 8 rotatable with respect to the traverse shaft 6, the line guide 9 provided at the slider 8 is composed of two guide bodies 91 opposite to each other in the moving direction of the slider 8, the guide bodies 91 being movable in the moving direction of the slider 8, between the respective guide bodies 91 and the slider 8 is provided a movement control mechanism A which moves the guide bodies 91 away from or toward each other and, when they move close to each other, nips between the guide bodies 91 the line to be wound onto the spool 2, and a control member 11 for rotatably operating the slider 8 through the tubular shaft 7 is provided.

Figure 2:
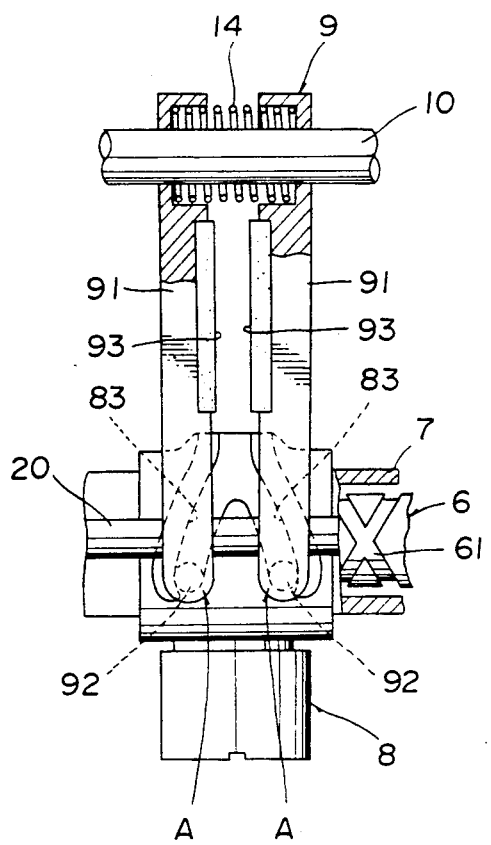
FIG. 2 is an enlarged front view of a principal portion thereof.

In the above-mentioned construction, the slider 8 is rotatable together whith the tubular shaft 7 with respect to the traverse shaft 6 in the state where the engaging member 81 is inserted into the window 71 at the tubular shaft 7. The tubular shaft 7 enters at one end thereof into the side frame 1a, at the entering portion of tubular shaft 7 is provided a passive element 12 projecting radially outwardly of the tubular shaft 7, and between the passive element 12 and the side frame 1a is interposed a return spring 13 for restoring the slider 8 and tubular shaft 7. Also, the slider 8, as shown in FIGS. 4 and 6, is cylindrical, and, as shown in FIGS. 2 and 3, provided at one lateral side with a pair of control grooves 83 shifting circumferentially from both axial sides to the axial center of slider 8.

The line guide 9 is so constructed that each guide body 91 is strip-like-shaped as shown in FIG. 4 and movably supported at one lengthwise end, that is, the upper end in FIG. 4, to the guide rod 10 and at the other lengthwise end, that is, the lower end in FIG. 4, to the guide rod 20, so as to be movable in parallel to the guide rods 10 and 20. Engaging projections 92 engageable with the control grooves 83 respectively are provided at the end portions of guide bodies 91 supported to the guide rod 20, so that the engaging projections 92 and control grooves 83 constitute the movement control mechanism A and the slider 8 is rotated to shift the engaging positions of engaging projections 92 with the control grooves 83 to thereby allow the guide bodies 91 to move away from or toward each other with respect to the slider 8 in the moving direction thereof. At the opposite surface of a lengthwise intermediate portion of each guide body 91 is a line nipping portion 93, and at one lengthwise end of guide body 91 is provided a coil spring 14 for biasing the guide bodies 91 in the direction of moving away from each other.

Figure 3:
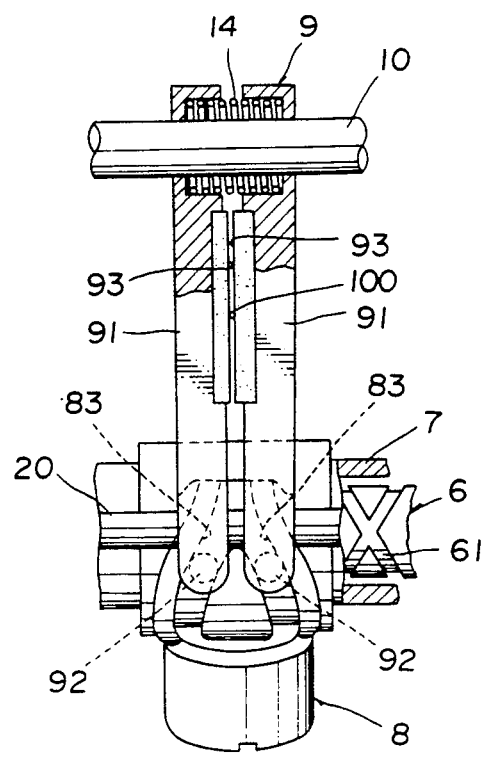
FIG. 3 is an illustration of the operating state of the same.

The control grooves 83 are cam-like-shaped to approach each other in the rotation direction of the slider 8, so that when the slider 8 is rotated by the control member 11, the guide bodies 91 move toward each other, whereby the line 100 to be wound onto the spool 2 can be nipped therebetween as shown in FIG. 3.

Since the engaging projections 92 engage with the control grooves 83 respectively, the guide bodies 91, when the slider 8 moves in reciprocation due to rotation of the traverse shaft 6, move in reciprocation together with the slider 8. When the control member 11 is not operated, the tubular shaft 7 and the slider 8 rotating together therewith are restored by restoration of return spring 13 and coil spring 14 and the guide bodies 91 move away from each other as shown in FIG. 2 so as to open the nipping portions 93. Hence, when the line is cast or wound up, resistance against the line drawn out from the spool 2 can be reduced and the line can be wound thereon with less resistance.

The control member 11, as shown in FIG. 5, is movably supported into a support bore provided at the side frame 1a and abuts at one end against the passive element 12, so that the slider 8 rotates together with the tubular shaft 7 by depressing the control member 11. Also, the control member 11 is provided at the outwardly projecting end with an operating portion 11a so as to be operable from the exterior and at the entering portion into the side frame 1a with a larger diameter portion 11b, and between the larger diameter portion 11b and the passive element 12 is provided a return spring 15.

Alternatively, the control member 11 may be provided at the side froam 1b.

In addition, reference numeral 16 in the drawing designates a clutch lever.

In the double-bearing fishing reel of the invention constructed as above-mentioned, when the line is drawn out from the spool 2 and cast for fishing, the control member 11 is not operated. In this case, as shown in FIGS. 1 and 2, the engaging projections 92 engage with the bifurcated portions of control grooves 83 and the guide bodies 91 are controlled to be positioned apart form each other, so that the line is insertable with less resistance, between the opposite surfaces of guide bodies 91. When the drawn-out line is stretched after casting, the angler extends the finger of his hand holding the side frame 1b and fishing rod and depresses by the finger the control member 11 positioned as shown in FIGS. 5, whereby the passive element 12 is urged by the control member 11 as shown in FIG. 7 and the slider 8 rotates clockwise in FIG. 4 together with the tubular shaft 7. Hence, the engaging projections 92 are guided by the control grooves 83 and shifted so that the guide bodies 91 move close to each other, thereby nipping the line between the line nipping portions 93 as shown in FIG. 3. Therefore, the line can be given desired tension. Accordingly, the handle shaft 3 is driven in the state where the control member 11 is operated, whereby the drawn-out line can be wound in a predetermined length onto the spool 2 without getting loose. The control member 11 is merely operated to enable the line to be readily given tension. Also, the line being given tension is wound up onto the spool 2 so as to be out of curl. Alternatively, the control member 11 does not abut against the passive element 12, but a gap may be provided therebetween so as to transmit the operating force from the control member 11 to the passive element 12 through the return spring 15, in which the nipping force to the line is adjustable with ease.

When the control member 11 is released, the return spring 15 restores it, the return spring 13 rotatably restores the tubular shaft 7 and slider 8 counterclockwise in FIG. 4, and the rotatable restoration of slider 8 and spring force of the spring 14 move the guide bodies 91 away from each other, thereby forming a gap between the line nipping portions 93 as shown in FIG. 2. Accordingly, even when a fish is hooked as well as the line is cast, the line can be cast or wound up without being subjected to large resistance and can be guided by the line guide 9 and reciprocated together with the slider 8 so as to be wound onto the spool 2.

In the above-mentioned embodiment, the guide bodies 91 are movable with respect to the slider, but alternatively, one of two guide bodies 91 may be made movable with respect to the slider 8 and the other not-movable, and the control grooves 83 and engaging projections 92 may be provided between the movable guide body 91 and the slider 8, so that the line may be nipped between the movable guide body 91 and the not-movable guide body 91.

Alternatively, as the movement control mechanism A, the control grooves 83 may be provided at the guide bodies 91 and the engaging projections 92 at the slider 8, which is not particularly defined in construction.

As seen from the above, the double-bearing fishing reel of the invention merely operates the operating member 11 to reliably give tension to the fishing line drawn out from the spool 2, thereby easily stretching the line and also being out of curl.

While a preferred embodiment of the invention has been described using specific terms, such description is for illustrative purpose only, and it is to be understood that changes and variations may be made without departing from the spirit or scope of the following claims.

What is claimed is:

1. A double-bearing fishing reel comprising:
   a) a pair of side frames;
   b) a spool rotatably supported between said side frames;
   c) a drive mechanism for rotating said spool;
   d) a traverse shaft having traverse grooves;
   e) means for rotating said traverse shaft upon rotation of said spool by said drive mechanism;
   f) a slider having an engaging member engageable with said traverse grooves and being movable in reciprocation axially of said traverse shaft upon rotation of said traverse shaft;
   g) a fishing line guide supported to said slider and being movable in reciprocation together with said slider, said fishing line guide comprising first and second guide bodies opposite to each other in the moving direction of said slider, at least said first guide body being supported to be movable with respect to said slider in the moving direction of said slider;
   h) a tubular shaft housing therein said traverse shaft and having a window extending axially thereof through which said engaging member extends, said tubular shaft being rotatably supported to said side frames, rotation of said tubular shaft causing rotation of said slider about an axis of said traverse shaft;
   i) a movement control mechanism provided between said first guide body and said slider, said movement control mechanism being operable upon rotation of said slider to forcibly move at least said first guide body between (a) a close-contact position in which a fishing line to be wound onto said spool is nipped between opposite surfaces of said guide bodies to apply a resistance to the fishing line; and (b) and open position in which there is a gap between the opposite surfaces of the guide bodies, and the fishing line is guided through the gap between the opposite surfaces; and
   j) a control member coupled to said tubular shaft for producing rotation of said tubular shaft and slider.

2. A double-bearing fishing reel according to calim 1, wherein both of said guide bodies are forcibly moved by said movement control mechanism between said close-contact position and said open position.

3. A double-bearing fishing reel according to claim 1, wherein said movement control mechanism comprises control grooves and engaging projections engageable with said control grooves, said control grooves being provided at one of said slider and first guide body, said engaging projections being provided at the other of said slider and first guide body.

4. A double-bearing fishing reel according to claim 1, further comprising a passive element which is engageable with said control member, wherein said passive element is formed at an axial end of said tubular shaft, said control member being supported to said side frame at a position oposite to said passive element, said control member being provided with an exposed operating portion.

5. A double-bearing fishing reel according to claim 1, wherein said guide bodies are movable in reciprocation together with said slider when said first guide body is in said close-contact position and when said first guide body is in said open position.

6. A double-bearing fishing reel comprising:
   a) a pair of side frames;
   b) a spool rotatably supported between said side frames;
   c) a drive mechanism for rotating said spool;
   d) a traverse shaft having tranverse grooves;
   e) means for rotating said traverse shaft upon rotation of said spool by said drive mechanism;
   f) a slider having an engaging member engageable with said traverse grooves and being movable in reciprocation axially of said traverse shaft upon rotation of said traverse shaft;
   g) means for supporting said slider between said side frames so that it is rotatable about an axis of said traverse shaft and movable in reciprocation axially of said traverse shaft;
   h) a movement control mechanism provided between said first guide body and said slider, said movement control mechanism being operable upon rotation of said slider to forcibly move at least said first guide body between (a) a close-contact position in which a fishing line to be wound onto said spool is nipped between opposite surfaces of said guide bodies to apply a resistance to the fishing line; and (b) an open position in which there is a gap between the opposite surfaces of the guide bodies, and the fishing line is guided through the gap between the opposite surfaces; and
   i) a control member mechanically coupled to said slider for rotating said slider.

* * * * *